(12) United States Patent
Dauba et al.

(10) Patent No.: US 6,430,964 B1
(45) Date of Patent: Aug. 13, 2002

(54) METHOD FOR IDENTIFYING A HEAT SOAK TESTED GLAZING

(75) Inventors: Henry Dauba, Margny les Compiegne; Andre Beyrle, Trancy le Val; Michel Chaunac, Magny les Hameaux, all of (FR)

(73) Assignee: Saint-Gobain Glass France, Courbevoise (FR)

( * ) Notice: Subject to any disclaimer, the term of this patent is extended or adjusted under 35 U.S.C. 154(b) by 0 days.

(21) Appl. No.: 09/486,711

(22) PCT Filed: Jul. 8, 1999

(86) PCT No.: PCT/FR99/01654

§ 371 (c)(1),
(2), (4) Date: Jul. 27, 2000

(87) PCT Pub. No.: WO00/02825

PCT Pub. Date: Jan. 20, 2000

(30) Foreign Application Priority Data

Jul. 10, 1998 (FR) .............................................. 98 08927

(51) Int. Cl.[7] .............................................. C03B 32/00
(52) U.S. Cl. ..................... 65/29.19; 65/33.4; 65/60.3; 65/114; 116/207; 116/216
(58) Field of Search ..................... 65/23, 29.12, 29.19, 65/33.4, 60.3, 114; 430/349; 427/228, 372.2, 386; 116/207, 216

(56) References Cited

U.S. PATENT DOCUMENTS

| | | | | |
|---|---|---|---|---|
| 2,606,654 A | * | 8/1952 | Davis et al. | 116/207 |
| 3,776,707 A | * | 12/1973 | Inoue et al. | 65/114 |
| 4,339,240 A | * | 7/1982 | Patel | 116/206 |
| 5,057,434 A | * | 10/1991 | Prusik et al. | 116/207 |
| 5,465,968 A | * | 11/1995 | Germain et al. | 116/207 |
| 5,476,792 A | * | 12/1995 | Ezrielev et al. | 116/219 |
| 5,891,811 A | * | 4/1999 | Ashida et al. | 442/123 |
| 6,037,041 A | * | 3/2000 | Van Kooyk et al. | 348/325 |
| 6,214,623 B1 | * | 4/2001 | Simons et al. | 116/207 |

* cited by examiner

*Primary Examiner*—Sean Vincent
(74) *Attorney, Agent, or Firm*—Oblon, Spivak, McClelland, Maier & Neustadt, P.C.

(57) ABSTRACT

A method of identifying glazing that has undergone a heat treatment, consisting of fixing a substance to its surface and/or on an edge, the optical characteristic of the substance being modified at a temperature reached during the heat treatment.

15 Claims, 1 Drawing Sheet

METHOD FOR IDENTIFYING A HEAT SOAK TESTED GLAZING

Figure 1:
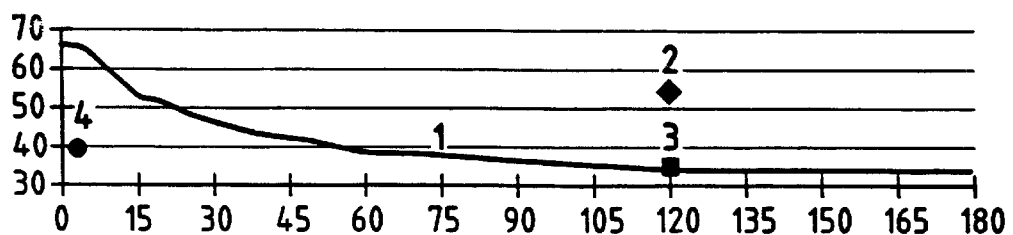

The invention relates to a method of identifying glazing that has undergone a heat treatment. The term "glazing" encompasses single or multiple glass panes, these being bare or coated with thin films, such as pyrolytic films, or with thick films, such as enamels.

Although the invention is not limited to such applications, it will more particularly be described with reference to glazing that has undergone a treatment of the "Heat Soak Test" type. This type of treatment allows, in a destructive manner, the detection of nickel sulphides in glass substrates, such as toughened, semi-toughened or hardened sheets of glass.

The presence of nickel sulphides in such glass substrates is known in the literature, but their origins are not very clear. Many origins have already been envisaged; it could come from the reduction of sodium sulphates and from the reaction with nickel oxide, coming, for example, from the nozzles of burners. It turns out in fact that, at the present time, no specific origin has been able to be determined, but these nickel sulphides are present in glass in the form of inclusions. Although these inclusions do not impair the main properties desired of the glass substrates, they do nevertheless result in a major problem in the case in particular of toughened glass sheets. This is because the presence of these nickel sulphide inclusions results in so-called "spontaneous" breakages of toughened glass sheets well after their production. Certain catalogued cases have shown breakage of such a toughened glass sheet more than ten years after its manufacture. The consequences of this drawback are serious, since the glass sheets have, of course, already been sold and then used. Moreover, since this type of glazing is especially used for the external cladding of building facades, a breakage in the glazing after it has been installed may lead to serious accidents due to the said glazing falling from, for example, building facades or from glazed roofs covering pedestrian walkways.

The various nickel sulphide compositions causing these problems have already been demonstrated. These are especially stoichiometric nickel sulphide NiS, $Ni_7S_8$ and nickel sulphides substoichiometric in nickel, $NiS_{(1+x)}$ with x varying from 0 to 0.08. These various compositions may be present in the glazing in the form of crystalline inclusions, the damaging diameters of which are essentially between 40 μm and 1 mm.

The abovementioned phenomenon of "spontaneous" breakage, but the breakage occurring over time, has also already been explained. Breakages associated with the presence of nickel sulphides in the glass are caused by the volume expansion which accompanies the transformation of the α phase (hexagonal phase) to the β phase (rhombohedral phase). The α phase is the "high temperature" phase of nickel sulphides, which is metastable at room temperature. The β phase is the "low temperature" phase, which is stable at room temperature. It is thus understandable that, if nickel sulphides exist in their α phase within glass sheets ready to be used or already used, transformations to the β phase will occur over time.

The presence of nickel sulphides in their α phase within glass sheets at room temperature may be explained, especially in the case of toughened glass sheets, by the heat treatment that they have undergone; this is because, in the case of thermal toughening, the rise in temperature of the glass sheet may lead to the appearance of the α phase if nickel sulphides are present. The rapid cooling which follows does not allow, because of its speed, complete return to a β phase. The glass sheets thus treated may therefore include nickel sulphides in the α phase, which will be transformed over time to a β phase, the said transformation being accompanied by a volume increase that causes the glass sheets to break.

For some uses of such glazing, especially those in which the breakage of the said glazing results in the risk of accidents, it is therefore necessary to detect glass sheets having nickel sulphide inclusions liable to cause breakage of the glass sheets over time.

One method, widely used, for detecting nickel sulphide, called the "Heat Soak Test", consists in accelerating the transformation of the high-temperature α phase to the low-temperature β phase, with respect to the rate of transformation at room temperature. Such a method therefore consists of a defined heat treatment resulting, as indicated previously, in destruction of any glazing comprising nickel sulphide inclusions.

In order to use such glass sheets, for example for the building industry, it is important to be able to identify the toughened glass sheets which have undergone a nickel sulphide detection treatment. This is because, although the building industry permits the use of toughened glass sheets which have not undergone this detection treatment, there are uses which require glass sheets free of nickel sulphide inclusions; these uses are, for example, the cladding of building facades which, above a certain height, make it dangerous to use glass sheets that may undergo spontaneous breakage over time.

The identification of glazing that has undergone a detection treatment therefore appears to be necessary in order to avoid any risk of confusion between glazing that has been treated and other glazing that has not been treated and which may, moreover, be identical. It is in fact preferable to prevent any confusion that may arise, for example when delivering or when storing the glazing.

One solution for the glassmaker consists in sticking a label on the glazing that has undergone a nickel sulphide detection treatment. However, such a solution has drawbacks; first of all, whatever the type of adhesion of the label, this may have deteriorated or even disappeared. Secondly, it requires vigilance and an infallible organization in order to prevent any error, and more particularly to prevent a label being stuck on untreated glazing. Although such an organization is achievable, it may be difficult to implement.

Thus, the objective of the invention is to provide a method of identifying treated glazing, especially treated using a technique of the "Heat Soak Test" type, by an indelible means under normal handling and storage conditions.

This objective is achieved according to the invention by a method of identifying glazing that has undergone a heat treatment, consisting in fixing a substance o its surface and/or onto an edge, an optical characteristic of the said substance being modified at a temperature reached during the heat treatment. In the case of glazing that includes thin or thick films, the substance may be fixed either on the glass or on he film.

According to a preferred way of implementing the invention, the optical characteristic modified is the colour. This choice makes it possible, in particular, for the modification to be very rapidly recognized usually. During manufacture or storage of the glazing, it is thus easy to avoid any risk of confusion be:ween treated glazing.

Other optical characteristics, such as light transmission or gloss, may be used.

According to the invention, a possibly coloured substance is therefore fixed to the glazing before the heat treatment, for example before the "Heat Soak Test" treatment in the case of nickel sulphide detection, and its optical characteristic changes during the said treatment. This method according to the invention thus permits, under the normal handling, and storage conditions, he glazing that has undergone the said heat treatment to be indelibly marked. Moreover, for the glassmaker this method simplifies the incorporation of this identification, the said identification being by its nature associated with the treatment; there is in fact no risk of marking untreated glazing.

The temperature leading to a change in the optical characteristic of the substance is, of course, above the temperatures to which the glazing may be subjected during their storage or handling at the glassmaker's premises and/or by the user.

According to a preferred way of implementing the invention, the resulting optical characteristic, that is to say the modified optical characteristic of the substance, obtained after treatment is defined by the maximum temperature reached during the treatment. According to such a method of implementation, it is thus furthermore possible for the glassmaker to check and/or prove that the said temperature has indeed been reached during the treatment. Particularly in the case in which several panes of glazing are treated in a heated chamber, this implementation may make it possible to see and/or check that the temperature has been reached at every point in the chamber or at the very least in any place in the chamber where the panes are placed during the treatment.

According to an advantageous variant of the invention, the modification of the optical characteristic appears after a temperature hold in the treatment. According to this variant, the modification of the optical characteristic is therefore obtained when the glazing has been treated at the above-mentioned temperature for a given time. In the case of a heat treatment which comprises a temperature hold, it is thus possible to stick on the glazing a substance whose variation in the optical characteristic depends, on the one hand, on the treatment temperature and, on the other hand, on the time that the glazing spends at this temperature.

Such an implementation has the advantage for the glassmaker to be able to control not only the temperature in the chamber during the treatment, but also the constancy of this temperature. Furthermore, it is thus possible for the glassmaker to provide a guarantee to his customers that the heat treatment has actually been carried out.

Also preferably, the invention provides for the resulting optical characteristic of the substance to depend on the residence time at a temperature reached during the heat treatment.

According to the latter preferred implementation of the invention, it is furthermore possible to authenticate the execution of the heat treatment. It is because the modification of the optical characteristic is defined, on the one hand, by the temperature, but also by the residence time at this temperature. Not only does too short a time not lead to the defined modification of the optical characteristic, but furthermore too long a time also leads to another modification of the optical characteristic.

According to one variant, and more particularly in the case in which the substance undergoes a modification of the optical characteristic associated with a temperature reached during the treatment but independent of the residence time at this temperature and of a step going to higher temperatures, the invention advantageously provides for the substance to be removed at the said higher temperatures. This alternative way of implementation makes it possible to avoid marking heat-treated glazing when too high a temperature is reached during the treatment, this having an inhibiting effect or even an effect contrary to the one desired.

More particularly in the case of a treatment of the "Heat Soak Test" type, it is known that at a temperature above approximately 330° C., the transformation of the α phase to the β phase does not occur properly, because of the kinetics of the two transformation back reactions. It is therefore beneficial to avoid marking the glazing that has been treated at too high a temperature and for which glazing the detection of nickel sulphides, which might generate spontaneous breakage, has been unable to be carried out with certainty.

Again more particularly in the case of a treatment of the "Heat Soak Test" type, the substance is deposited on the glazing after a thermal toughening treatment. It is thus possible either to provide a variation in the optical characteristic, which would be independent of the "Heat Soak Test" treatment or to destroy the substance during the rise in temperature of the glass in order to carry out the thermal toughening.

According to a preferred variant of the invention, the substance is a curable ink. This may, for example, be ink of the epoxy, polyurethane, acrylic, or other type.

According to this latter variant, the ink is advantageously deposited on an end and/or an edge of a pane, the latter having already been thermally toughened. The ink thus deposited is then cured at a temperature below that which modifies the optical characteristic during the heat treatment. Preferably it does not exceed 220° C., especially in the case of a treatment of the "Heat Soak Test" type. During a treatment of the "Heat Soak Test" type, the pane is raised to a temperature which may be between 270° C. and 330° C. At these temperatures, and possibly for a given time at a temperature, the ink degrades; this degradation is visually manifested particularly by a colour variation which confirms that a given temperature has been reached and/or that time has been spent at a given temperature.

The invention thus described therefore makes it possible to be able to identify, directly on a pane, the heat treatment that it has undergone, or indeed to prove that the said treatment has been carried out.

Further advantageous details and characteristics of the invention will emerge below from the description of an example of its implementation.

This example relates to the marking of glazing heat treated using a method of the "Heat Soak Test" type for the purpose of detecting nickel sulphide inclusions.

The glazing undergoes thermal toughening beforehand. During this treatment, the temperature of the glazing is raised to approximately 650° C. During this temperature rise, if nickel sulphide inclusions are present they are transformed from the low-temperature β phase into the high-temperature α phase. The rapid cooling which follows results in the α phase, unstable at low temperatures, being frozen in. The α phase-to-β phase transformation reaction then continues, but very slowly at ambient temperatures during use of the glazing. The said transformation may take place over very long periods of time, possibly of he order of several years. Moreover, the said α phase-to-β phase transformation is accompanied by an expansion of the inclusions, and this may bring about breakage of the glazing which, when the latter is used for example as a building facade, may prove to be dangerous.

It is therefore of paramount importance for the glassmaker o deliver toughened glazing that is risk-free during its use and is therefore free of nickel sulphide inclusions.

To do this, one solution consists in detecting, and eliminating by destruction, any glazing having nickel sulphide inclusions. The treatments of the "Heat Soak Test" type allow, by raising the temperature, the transformation of the α phase to the β phase to be activated.

The glazing forming the subject of the test undergoes a "Heat Soak Test" treatment consisting of a temperature hold for a period of at least two hours at 300° C.

The object of the present invention is to mark the glazing that has undergone this treatment. To do this, an epoxy ink is deposited, before the "Heat Soak Test" treatment, along the edge of a surface of the glazing using a screen-printing technique. The ink deposited is sold under the reference No. 10 in the 8500 series by Dubuit. The ink is premixed with the hardener referenced 8599 from the same company with a weight content of 10%. Next, the ink is cured at 80° C. for 30 minutes. Having deposited the ink, the glazing then undergoes the "Heat Soak Test" treatment.

During the treatment, the colour of the ink, which initially was yellow, turns brown. The variation in the colour of the ink deposited thus makes it possible for the glassmaker on the one hand, but essentially for the user on the other, for example in the building industry, to recognize glazing that has undergone the "Heat Soak Test" treatment and that has no risk of breaking over time.

In addition, the inventors have carried out precise measurements of the colour using the L*,a*,b* chromaticity coordinates.

These measurements were performed, under illuminant $D_{65}$ and at a viewing angle of 10°, using a spectrocolorimeter sold by Minolta with the reference CM 2002.

The measurements were carried out on specimens of glass deposited on a black background, on that face on which the ink is deposited.

The thickness of ink deposited on the specimens was 12 microns.

The table below gives the various measurements carried out on specimens that have undergone a heat treatment up to 300° C., with various residence times (expressed in minutes) at 300° C.

|  | Start | 5 min | 15 min | 30 min | 60 min | 120 min | 180 min |
|---|---|---|---|---|---|---|---|
| L* | 65.45 | 63.21 | 52.35 | 45.71 | 38.78 | 34.88 | 34.81 |
| a* | −14.76 | −12.12 | −1.29 | 3.25 | 4.12 | 3.90 | 3.87 |
| b* | 54.77 | 48.05 | 33.84 | 25.82 | 17.19 | 11.45 | 10.85 |

The start gives the value of the parameters before the heat treatment.

The second table below gives the measured values of the L*,a*,b* coordinates for specimens that have undergone a heat treatment not corresponding to the "Heat Soak Test" treatment and therefore at variable temperatures reached and also variable temperature hold times.

|  | Start | 250° C.— 120 min | 350° C.— 120 min | 620° C.— 3 min |
|---|---|---|---|---|
| L* | 65.45 | 54.00 | 35.00 | 38.71 |
| a* | −14.76 | −1.10 | 3.83 | 0.78 |
| b* | 54.77 | 36.59 | 7.82 | 6.72 |

The inventors have also measured the variations in another optical characteristic, namely the optical density, during the "Heat Soak Test" treatment.

The table below gives the optical density measurements carried out on specimens that have undergone a heat treatment at 300° C., with a variable residence time (expressed in minutes) at 300° C.

|  | Start | 5 min | 15 min | 30 min | 60 min | 120 min | 180 min |
|---|---|---|---|---|---|---|---|
| Optical density | 0.76 | 0.78 | 1.13 | 1.62 | 2.04 | 2.05 | 2.36 |

As previously, the start gives the optical density value before the heat treatment.

The final table, below, gives the optical density measurements for specimens that have undergone a heat treatment not corresponding to the "Heat Soak Test" treatment and therefore to variable temperatures reached and also variable temperature hold times.

|  | Start | 250° C.— 120 min | 350° C.— 120 min | 620° C.— 3 min |
|---|---|---|---|---|
| Optical density | 0.76 | 1.06 | 2.57 | 3.35 |

Figure 2:
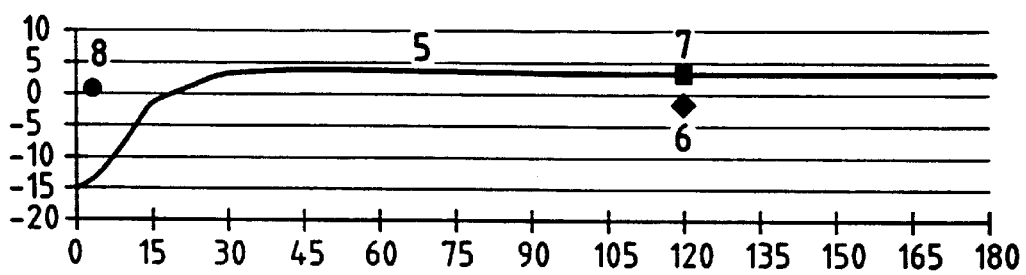
Figure 3:
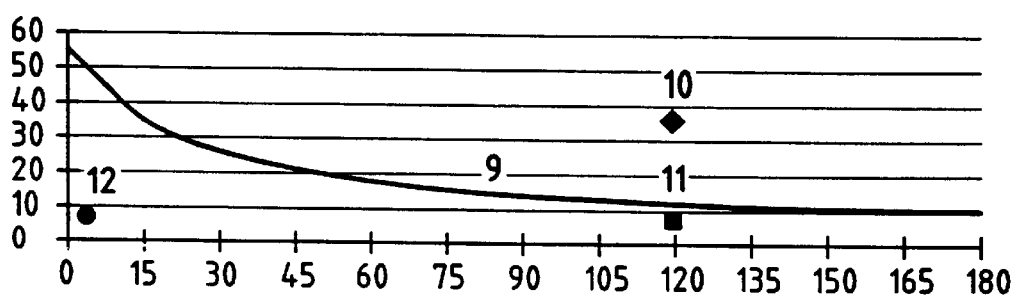
Figure 4:
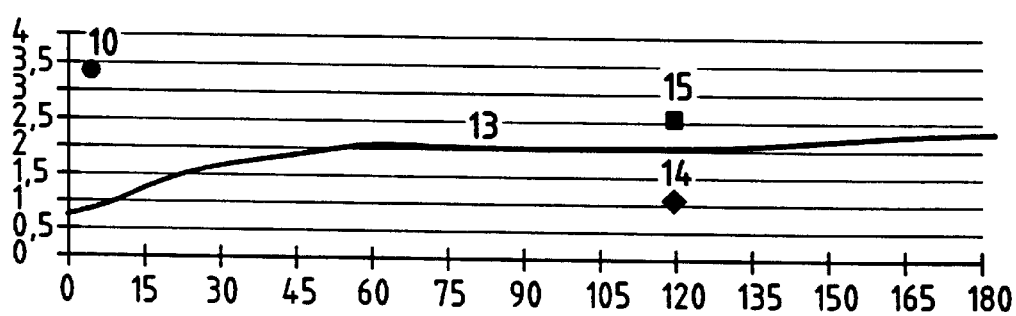

All the data in these tables has allowed the curves in the figures to be plotted, these representing:

FIG. 1: the values of the L* coordinate as a function of the residence time at a temperature reached;

FIG. 2: the values of the a* coordinate as a function of the residence time at a temperature reached;

FIG. 3: the values of the b* coordinate as a function of the residence time at a temperature reached; and FIG. 4: the optical density values as a function of the residence time at a temperature reached.

In FIG. 1, curve 1 shows the change in the L* coordinate as a function of the residence time at 300° C.; point 2 corresponds to a treatment at 250° C. for 2 hours; point 3 corresponds to the treatment at 350° C. for 2 hours and point 4 corresponds to the treatment at 620° C. for 3 minutes.

It is therefore clearly apparent that measuring this L* coordinate makes it possible to know whether the treatment was carried out at a temperature of at least 300° C. and for a time of at least 2 hours. On the other hand, it is apparent that a treatment at a higher temperature or for a longer temperature hold time cannot be identified.

In FIG. 2, curve 5 shows the change in the a* coordinate as a function of the residence time at 300° C.; point 6 corresponds to the treatment at 250° C. for 2 hours; point 7 corresponds to the treatment at 350° C. for 2 hours and point 8 corresponds to the treatment at 620° C. for 3 minutes.

Interpretation of this figure shows the same weaknesses for the a* coordinate as for the L* coordinate. Furthermore, although it is possible to identify the treatment temperature up to 300° C., it seems more difficult to confirm the duration of the temperature hold at this temperature.

In FIG. 3, curve 9 shows the change in the b* 10 coordinate as a function of the residence time at 300° C; point 10 corresponds to the treatment at 250° C. for 2 hours; point 11 corresponds to the treatment at 350° C. for 2 hours and point 12 corresponds to the i treatment at 620° C. for 3 minutes.

It is apparent from FIG. 3 that measuring the b* coordinate makes it possible to check that the heat treatment has been carried out at a temperature of 300° C. for at least 2 hours. This is because it is apparent that a treatment at higher temperatures is distinguishable.

Moreover, in the case of the "Heat Soak Test" treatment, although it is not possible to identify a 300° C. treatment with a residence time longer than 2 hours, this is not a drawback. This is because, although the temperature for carrying out this treatment is imposed, with regard to the duration of the temperature hold, only a minimum time is required. Longer temperature hold times do not impair the effectiveness of the treatment.

Measuring these coordinates and more particularly measuring the b* coordinate can allow the heat treatment undergone by the ink deposited on the glazing to be identified and therefore makes it possible to guarantee that the "Heat Soak Test" treatment has been carried out.

With regard to the measurement of the optical density, FIG. 4 shows curve 13, which represents the change in the optical density as a function of the residence time at 300° C.; point 14 corresponds to the treatment at 250° C. for 2 hours; point 15 corresponds to the treatment at 350° C. for 2 hours and point 16 corresponds to the treatment at 620° C. for 3 minutes. It is apparent that this measurement is very useful and can make it possible to guarantee the treatment temperature on the one hand and the treatment duration on the other; however, it is apparent that guaranteeing a minimum time of 2 hours is more uncertain.

Moreover, tests of the adhesion of the ink to the glass after the "Heat Soak Test" treatment were carried out. It turns out that the adhesion complies with Class 1 according to ISO 2409 standard. This makes it possible, in particular, to guarantee that the ink will be present on the glazing right up to its use, for example on a building, without the risk of the ink being removed during various handling operations.

Furthermore, the ink thus used may have other functions and may especially allow an inscription such as a reference or a registered trademark.

What is claimed is:

1. Method of identifying glazing that has undergone a heat treatment, comprising fixing a substance to a least one of a surface and an edge of the glazing, characterized in that an optical characteristic of the substance is modified at a temperature in a range of 270° C. to 330° C. reached during the heat treatment.

2. Method according to claim 1, characterized in that the optical characteristic modified is the colour.

3. Method according to claim 1, characterized in that the resulting optical characteristic is defined by the maximum temperature reached during the treatment.

4. Method according to claim 1, characterized in that the modification of the optical characteristic appears after a treatment temperature hold.

5. Method according to claim 1, characterized in that the optical characteristic of the substance depends on the residence time at a temperature reached during the heat treatment.

6. Method according to claim 1, characterized in that the said substance can be removed at a temperature above the temperature of the heat treatment defining the resulting optical characteristic.

7. Method according to claim 1, characterized in that the substance is a curable ink.

8. Method according to claim 7, characterized in that the ink is cured at a temperature below that which modifies the optical characteristic during the heat treatment.

9. Method according to claim 8, characterized in that the ink is cured at a temperature of 220° C. or less.

10. Method according to claim 1, characterized in that adhesion of the substance to the glazing after the heat treatment complies with ISO 2409 Class 1.

11. Method according to claim 1, characterized in that the heat treatment is at a temperature and for a time sufficient to transform all α phase NiS in the glazing to β phase NiS.

12. Method according to claim 1, characterized in that the optical characteristic is selected from the group consisting of color, light transmission and gloss.

13. Method of identifying glazing that has undergone a heat soak test heat treatment, comprising fixing a substance to at least one of a surface and an edge of the glazing, characterized in that an optical characteristic of the substance is modified at a temperature reached during the heat treatment; and the substance is deposited on the glazing after a thermal toughening treatment.

14. Method according to claim 13, characterized in that the substance is on ink that is or of an epoxy, polyurethane and acrylic.

15. Method according to claim 13, characterized in that the heat treatment is at a temperature and for a time sufficient to transform all α phase NiS in the glazing to β phase NiS.

* * * * *

UNITED STATES PATENT AND TRADEMARK OFFICE
CERTIFICATE OF CORRECTION

PATENT NO. : 6,430,964 B1
DATED : August 13, 2002
INVENTOR(S) : Dauba et al.

It is certified that error appears in the above-identified patent and that said Letters Patent is hereby corrected as shown below:

<u>Title page,</u>
Item [73], the Assignee information is incorrect. Item [73] should read:

-- [73] Assignee: Saint-Gobain Glass France,
Courbevoie (FR) --

Signed and Sealed this

Seventeenth Day of December, 2002

JAMES E. ROGAN
*Director of the United States Patent and Trademark Office*